Oct. 6, 1931.  A. E. JORDAN  1,826,136
CAMP TRAILER
Filed Nov. 12, 1928   5 Sheets-Sheet 1
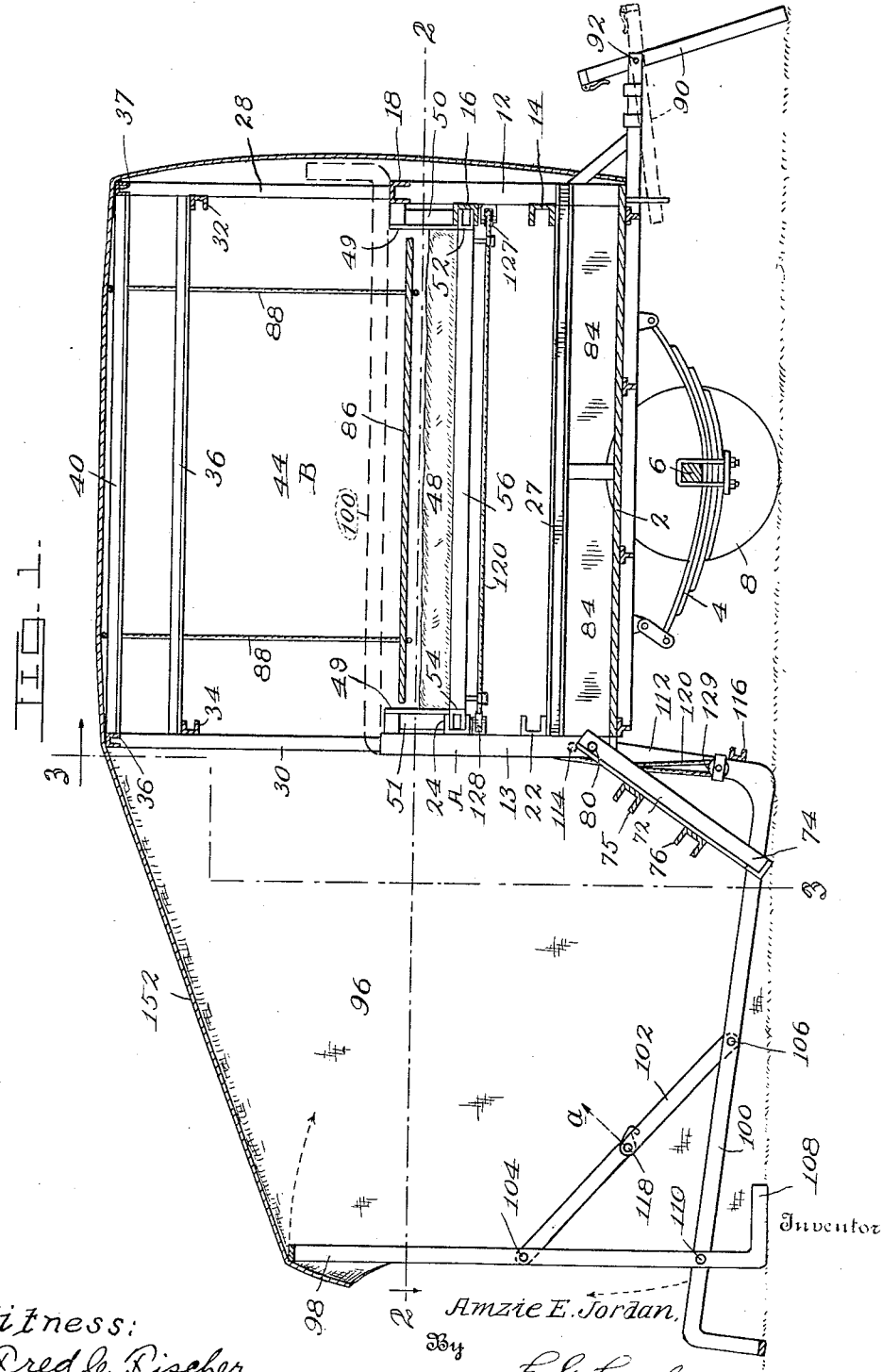
Witness:
Fred C. Fischer.
Inventor
Amzie E. Jordan,
By
F. G. Fischer,
Attorney.

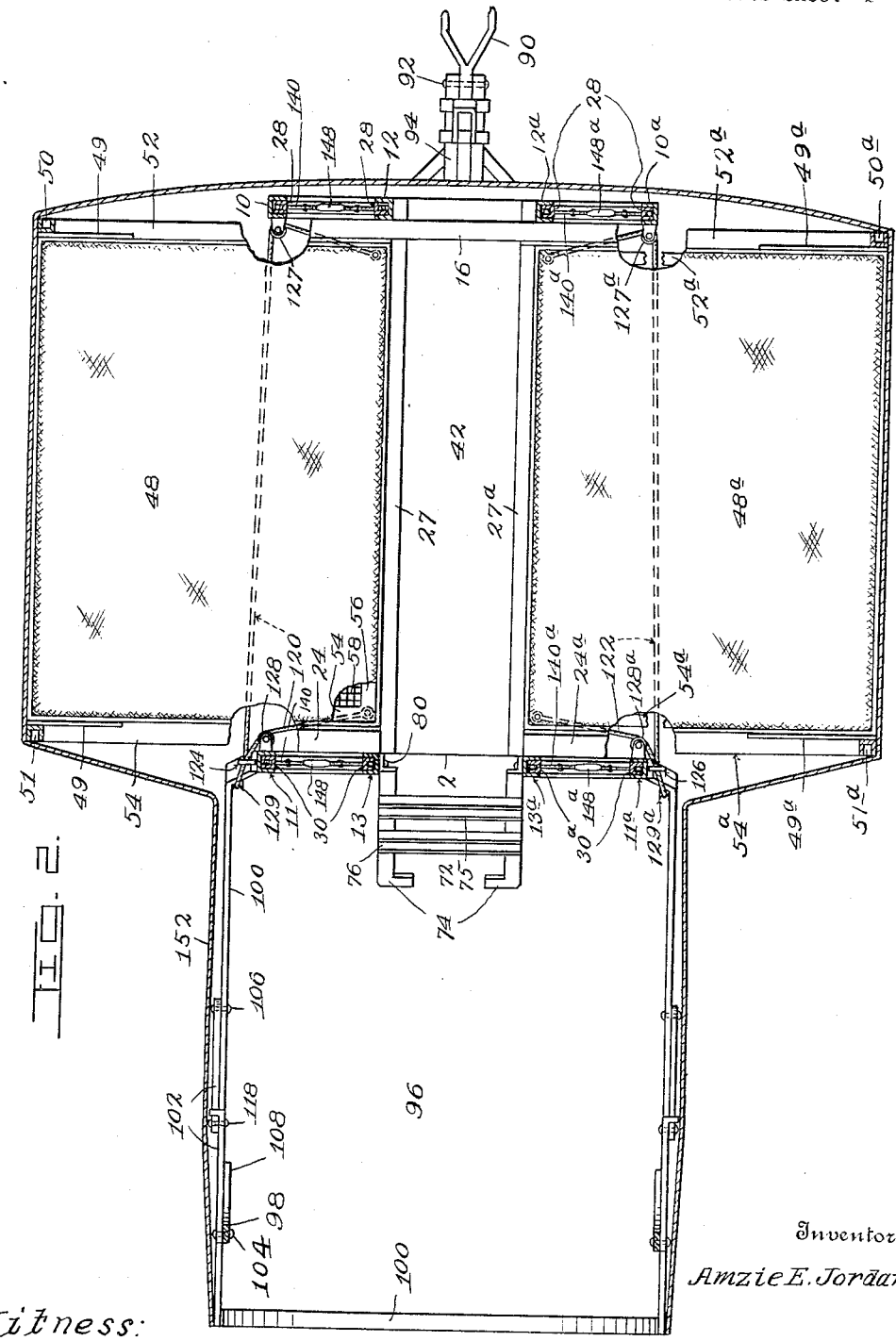

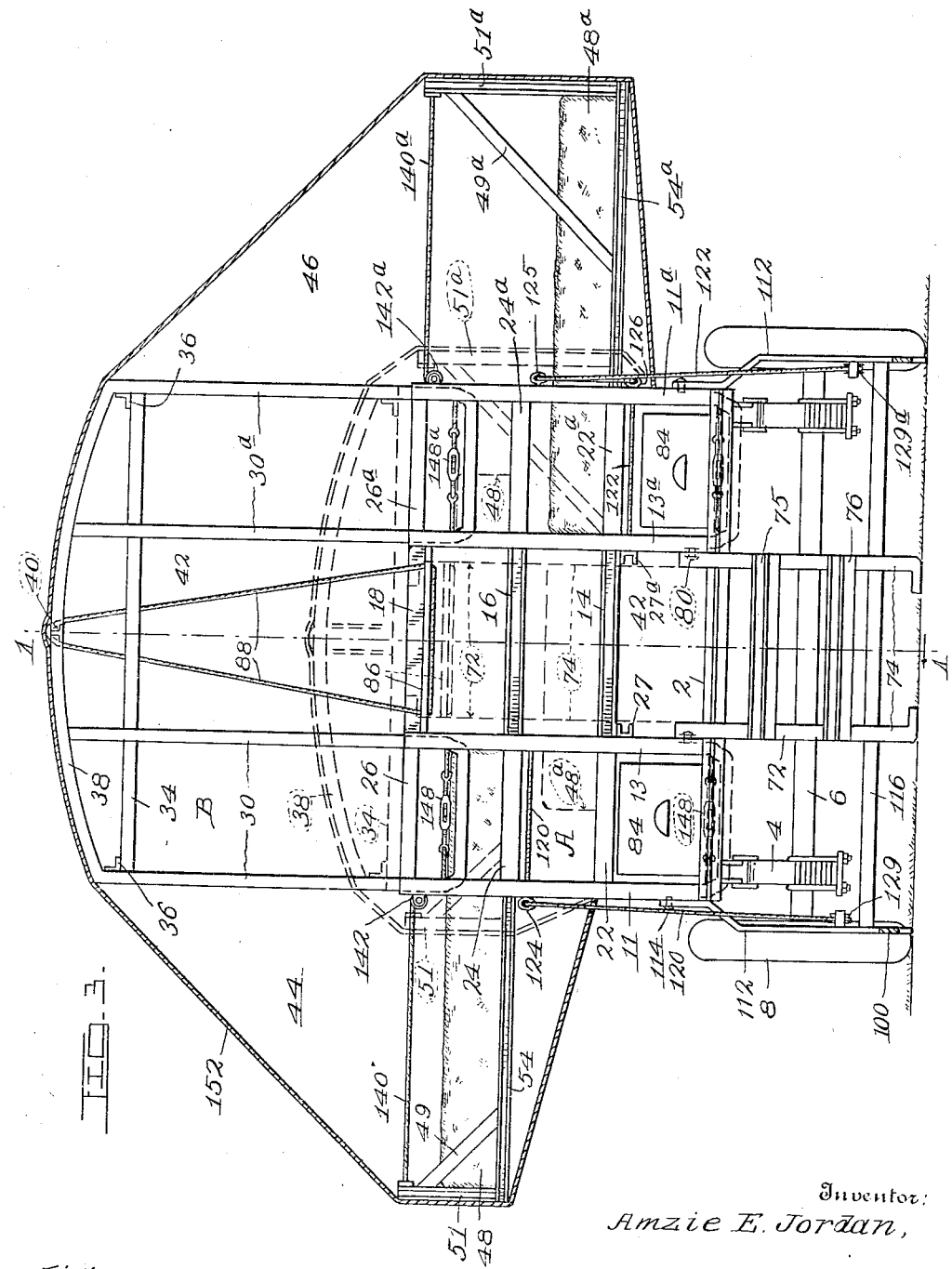

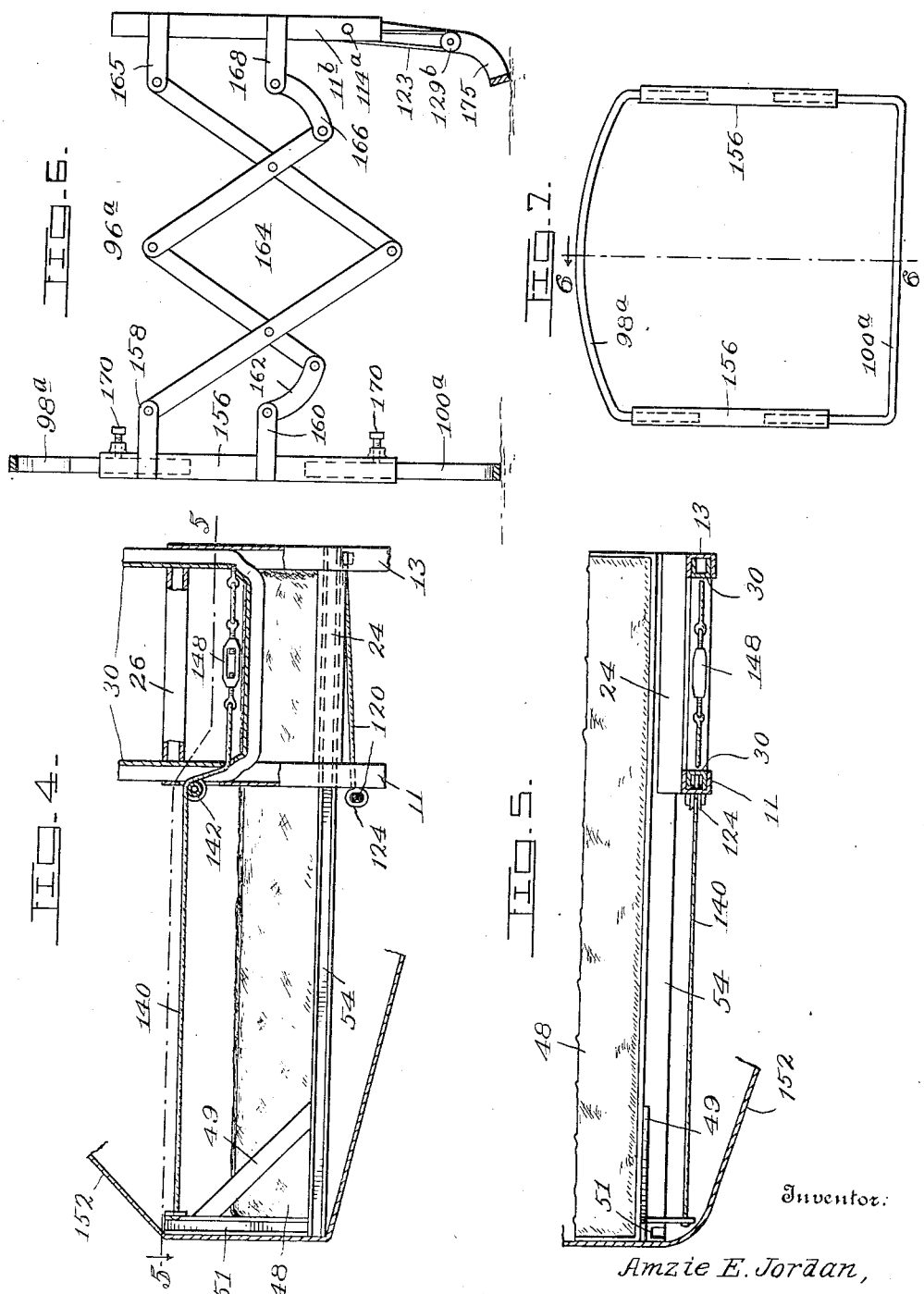

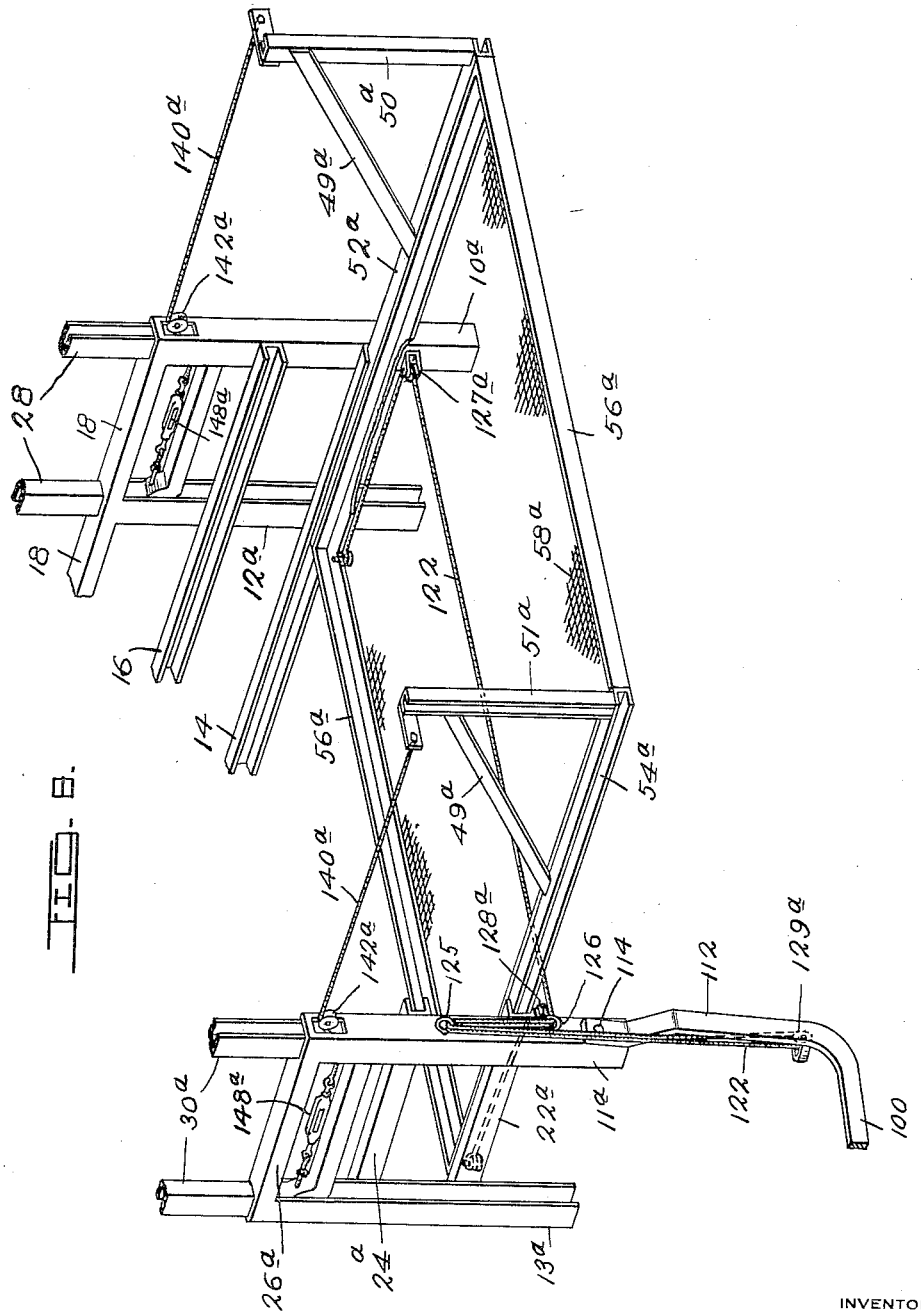

Patented Oct. 6, 1931

1,826,136

UNITED STATES PATENT OFFICE

AMZIE E. JORDAN, OF BELOIT, KANSAS

CAMP TRAILER

Application filed November 12, 1928. Serial No. 318,918.

My invention relates to camp trailers and one object is to equip a trailer of this character with a top which may be raised to provide ample head room when in camp, or lowered into compact form preparatory to traveling on this road.

Another object is to provide sleeping compartments which can be extended for use or contracted into compact form for traveling.

A further object is to provide a camp trailer with an extension which can be opened up for use as a kitchenette or as an extra sleeping compartment, or it may be folded into compact form for traveling.

Another object is to provide drawers or other storage space for stowing away cooking utensils, clothing, fishing tackle and other accessories, and in order that the invention may be fully understood reference will now be had to the accompanying drawings, in which:

Fig. 1 is a vertical longitudinal section on line 1—1 of Fig. 3, showing the trailer set up for use as a camp.

Fig. 2 is a horizontal section on line 2—2 of Fig. 1.

Fig. 3 is an irregular vertical cross section on line 3—3 of Fig. 1.

Fig. 4 is an enlarged fragmentary view, partly in section, of a portion of the rear end of the trailer and one of the beds.

Fig. 5 is a fragmentary horizontal section on line 5—5 of Fig. 4.

Fig. 6 is a vertical section on line 6—6 of Fig. 7 showing a modified form of kitchenette.

Fig. 7 is a rear elevation of said kitchenette.

Fig. 8 is a fragmentary perspective view showing some of the cables for raising the top and adjusting one of the beds employed in carrying out the invention.

Referring in detail to the different parts, 2 designates a platform constituting the floor of the trailer and which is mounted upon a two wheeled running gear comprising springs 4, an axle 6 and a pair of wheels 8.

The platform 2 supports a light but rigid main skeleton frame designated generally by the reference character A and consisting of front corner posts 10 and 10a, rear corner posts 11 and 11a, intermediate front posts 12 and 12a, intermediate rear posts 13 and 13a, transverse rails 14 and 16 and a transverse bar 18 rigidly connected to the front posts 10, 10a, 12 and 12a, transverse rails 22 and 24 and a transverse bar 26 rigidly connected to the rear posts 11 and 13, transverse rails 22a and 24a and a transverse bar 26a rigidly connected to the rear posts 11a and 13a, a longitudinal bar 27 connected to the posts 12 and 13 and the transverse bar 22, and a longitudinal bar 27a connected to the posts 11a and 13a and the transverse bar 22a.

I also provide a secondary skeleton frame B which is vertically slidable on the main frame A so that said frame B can be raised to give ample head room when in camp, or lowered for traveling. The secondary frame B consists of standards 28 which telescope in the front posts 10, 12, 10a and 12a, standards 30 which are united at their lower ends and telescope in the rear posts 11 and 13, standards 30a which are united at their lower ends and telescope in the rear posts 11a and 13a, a transverse bar 32 uniting the standards 28, a transverse bar 34 uniting the standards 30 and 30a, longitudinal bars 36 rigidly secured at their ends to the transverse bars 32 and 34, an arched bar 37 uniting the upper ends of the front standards 28, an arched bar 38 uniting the upper ends of the rear standards 30 and 30a, and a ridge pole 40 uniting the upper central portions of the front and rear arched bars 37 and 38, respectively.

As shown by Figs. 2 and 3, the rear rails, 22, 24, 22a and 24a and the rear bars 26 and 26a, do not extend across from post 13 to the post 13a, but are cut off to leave an entrance to a central aisle 42 extending the length of the trailer so that access can be readily had to a pair of oppositely-disposed sleeping compartments provided with beds and designated generally by the reference characters 44 and 46, respectively. The bed for the compartment 44 includes a cotton or other suitable mattress 48 and a frame including corner posts 50 and 51, braces 49 for said corner posts 50 and 51, transverse front and rear slides 52 and 54 upon the outer ends of which the posts 50 and 51 respectively, are mounted, and longitudinal bars 56 connected to the slides 52 and 54. A wire or other suitable mattress 58 is stretched across the bed frame to support the mattress 48.

The bed in the compartment 46 is similar to the bed in the compartment 44 as is evidenced by corresponding reference numerals with exponents "a," the only difference being that the mattress 48 and its supporting frame are arranged on a higher plane than the mattress 48a, so that the former may pass over the latter as shown by dotted lines, Fig. 3, when the trailer is being adjusted into compact form for the road. In order that the beds may be readily shifted towards or away from each other the front slide 52 of the bed in the compartment 44 is slidably mounted in the front rail 16 and the rear slide 54 is arranged to slide in the rear rails 24 and 24a, while the front slide 52a of the bed in the compartment 46 is slidably mounted in the front rail 14 and the rear slide 54a is arranged to slide in the rear rails 22 and 22a.

In order that the secondary frame B and the beds may be operated in unison I connect said frame B to the beds with cables 140 and 140a. One of the cables 140 is attached at its ends to the bed post 50 and one of the intermediate standards 28, while the other cable 140 is attached to the bed post 51 and the intermediate standard 30. The cables 140 run over guide sheaves 142 mounted on the corner posts 10 and 11 and are kept taut with turnbuckles 148.

One of the cables 140a is attached at its ends to the bed post 50a and the other intermediate standard 28, while the other cable 140a is attached to the bed post 51a and the intermediate standard 30a. The cables 140a run over guide sheaves 142a mounted on the corner posts 10a and 11a and are tensioned with turnbuckles 148a.

Ingress and egress is had to the aisle 42 by means of a foldable ladder 72 consisting of a pair of parallel side bars 74 and two transverse steps 75 and 76. The upper ends of the side bars 74 are operably connected as by pivots 80 to the intermediate posts 13 and 13a, so that the ladder 72 may be lowered to the full line position or swung upwardly to the dotted line position, Fig. 3. The steps 75 and 76 are so positioned that when the ladder 72 is raised the step 75 will come in line with the rails 22 and 22a, while the step 76 will come in line with the rails 24 and 24a, and, like said rails, are of channel cross section to receive and assist in supporting the rear slides 54 and 54a of the respective beds when the latter are adjusted inwardly to the dotted line position, Fig. 3.

84 designates drawers arranged upon the floor 2 and at opposite sides of the aisle 42, for holding clothes, blankets, fishing tackle and other camping accessories. Access may be had to said drawers 84 whether the secondary top B be folded or extended.

86 designates a table suspended in the aisle 42 by means of cables 88 extending over the ridge pole 40. The table 86 is on a higher plane than the mattresses 48 and 48a, so that it may be used as a dining or other table by persons seated upon said mattresses.

When ready to travel the trailer is connected to the automobile by means of a tongue 90 operably secured as by a pivot 92 to sills 94 extending longitudinally beneath the floor 2. Said tongue 90 also constitutes a support for the forward end of the trailer while at rest, at which time it is adjusted from the dotted line to the full line position disclosed by Fig. 1.

96 designates a foldable extension at the rear of the trailer adapted to be used as a kitchenette or as an extra sleeping compartment. Said extension 96 includes a collapsible frame comprising an arched member 98, a U-shaped member 100, and a pair of braces 102 operably connected at their ends to the arched member 98 and the U-shaped member 100 by pivots 104 and 106, respectively. The arched member 98 is bent at right angles at its lower ends as indicated at 108 to provide feet for resting upon the ground as shown by Fig. 1, and said arched member 98 is operably connected at its lower portions by pivots 110 to the rear portions of the U-shaped member 100. The opposite sides of the U-shaped member 100 are bent upwardly at their ends as indicated at 112 and connected by pivots 114 to the rear corner posts 11 and 11a. The upwardly extending portions 112 are reinforced and united by a transverse brace 116. Each brace 102 has a pivotal joint 118 intermediate its ends so that it may fold when the arched member 98 is folded upon the U-shaped member 100.

The U-shaped member 100 is connected to the beds for drawing the latter outwardly by means of cables 120 and 122. The cable 120 runs over guide sheaves 127, 128 and 129 mounted upon the corner posts 10 and 11 and one side of the U-shaped member 100, while the cable 122 runs over guide sheaves 127a, 128a and 129a mounted upon the corner posts 10a, 11a and the opposite side of the U-shaped member 100, respectively. The cable 120 also runs through a guide 124 mounted on the corner post 11 and arranged approximately on a level with the guide sheaves 128. The cable 122 runs through a guide 125 mounted on the corner post 11a on the same level as the guide 124, and then runs down through a guide 126 mounted on the post 11a and arranged approximately on a level with the guide sheaves 127a and 128a. By arranging the guides 124, 125 and 126 as stated the cables 120 and 122 will draw the respective beds outwardly approximately the same distance.

The skeleton frames A and B and the extension 96 are enclosed in a canvas or other waterproof cover 152.

In preparing the trailer for the road the ladder 72 is raised to the dotted line position disclosed by Fig. 3, after which the braces 102 are broken at the joints 118 in the direction of the arrow a, Fig. 1, so that the arched member 98 may be folded against the U-shaped member 100 which is then swung upwardly over the top of the trailer to the dotted line position disclosed by Fig. 1. As the folded extension 98 is swung upwardly the cables 120 and 122 become slack and permit the skeleton top B to slide down to the dotted line position, which operation causes the cables 140 and 140a to draw the beds inwardly to the dotted line positions, Fig. 3. When camp is made the extension 96 is swung backwardly from the top of the trailer, causing the cables 120 and 122 to pull the beds outwardly to the full line positions, Fig. 3. As the beds move outwardly they raise the top B through the intermediary of the cables 140 and 140a. The extension 96 is then unfolded and cooperates with the tongue 90, which has been previously adjusted to the full line position, Fig. 1, in balancing the trailer on its two wheeled running gear.

In the modified form of extension 96a disclosed by Figs. 6 and 7, the frame consists of an arched member 98a, a U-shaped member 100a, sleeves 156 into which the ends of the arched member 98a and the U-shaped member 100a telescope, upper and lower arms 158 and 160 fixed to the sleeves 156, links 162 pivotally connected to the arms 160, lazy tongs 164 pivotally connected at their rear ends to the arms 158 and the links 162 and at their forward ends to arms 165 and links 166, which latter are pivotally connected to arms 168 secured to the rear corner posts 11b of the trailer. The sleeves 156 are provided with set screws 170 which secure the arched and U-shaped members 98a and 100a, respectively, at any point of their adjustment in said sleeves 156. In order to fold the extension 96a it is only necessary to lower the arched member 98a, raise the U-shaped member 100a, and then push forwardly upon the sleeves 156 to fold the lazy tongs 164. After the extension 96a has been thus folded the sleeves 156 may be secured by any suitable means, not shown, to the adjacent parts of the trailer. A U-shaped lever 175 is operably connected by pivots 114a to the rear portion of the trailer and provided with guide sheaves 129b over which cables 123 may run to the beds for operating the latter in the same manner as the cables 120 and 122 operate the beds 48 and 48a, respectively.

From the foregoing description it is apparent that I have provided a trailer embodying the advantages above pointed out, and while I have shown and described one preferred and one modified form I reserve all rights to such other forms and modifications as properly fall within the spirit and scope of the invention as claimed.

Having thus described my invention, what I claim and desire to secure by Letters Patent, is:

1. The combination with a trailer, a main frame mounted upon said trailer, a vertically adjustable secondary frame mounted upon said main frame, and an extension consisting of a U-shaped member bent upwardly at its ends and operably connected to the main frame so that it can be adjusted to a substantially horizontal position for use or folded over the secondary frame for traveling, an arched member operably connected to the rear portion of said U-shaped member so that it can be adjusted to an upright position or folded against the U-shaped member, and braces operably connected at their ends to the U-shaped member and said arched member for securing the latter in upright position, said braces being jointed intermediate their ends so that they may be folded with the arched member.

2. The combination with a trailer, a frame mounted upon said trailer, rails fixed to said frame, beds slidably mounted upon said rails, and a ladder operably mounted at one end of the trailer so that it may be raised or lowered and provided with steps which cooperate with said rails in supporting the beds when said ladder is adjusted to raised position.

3. The combination with a trailer, a main frame mounted upon said trailer, a vertically adjustable secondary frame mounted upon said main frame, beds adjustable laterally of the main frame, suitably guided cables for adjusting said beds, and a suitably covered extension for actuating said cables consisting of a U-shaped member bent at its ends and pivotally connected to the main frame so that it may be adjusted to approximately a horizontal position for use or folded over the secondary frame for traveling, and an arched member pivotally connected to said U-shaped member and provided at its ends with feet upon which it may stand when said extension is in use.

In testimony whereof I affix my signature.

AMZIE E. JORDAN.